Jan. 20, 1925.

N. H. ANDERSON 1,523,503

WEIGHING SCALE

Filed Sept. 10, 1921   3 Sheets-Sheet 1

INVENTOR
Nils H. Anderson
BY
Duell, Warfield & Duell.
ATTORNEY

Jan. 20, 1925.　　　　　　　　　　　　　　　　　　　　1,523,503
N. H. ANDERSON
WEIGHING SCALE
Filed Sept. 10, 1921　　　3 Sheets-Sheet 2

INVENTOR
Nils H. Anderson
BY
Duell, Warfield & Duell
ATTORNEY

Jan. 20, 1925.

N. H. ANDERSON

WEIGHING SCALE

Filed Sept. 10, 1921   3 Sheets-Sheet 3

1,523,503

INVENTOR
Nils H. Anderson
BY
Duell, Warfield & Duell
ATTORNEY

Patented Jan. 20, 1925.

1,523,503

UNITED STATES PATENT OFFICE.

NILS H. ANDERSON, OF BRIDGEPORT, CONNECTICUT, ASSIGNOR TO E. AND T. FAIRBANKS AND COMPANY, OF ST. JOHNSBURY, VERMONT, A CORPORATION OF VERMONT.

WEIGHING SCALE.

Application filed September 10, 1921. Serial No. 499,725.

*To all whom it may concern:*

Be it known that I, NILS H. ANDERSON, a citizen of the United States, residing at Bridgeport, in the county of Fairfield and State of Connecticut, have invented certain new and useful Improvements in Weighing Scales, of which the following is a full, clear, and exact description, such as will enable others skilled in the art to which it appertains to make and use the same.

This invention relates to weighing scales and with respect to its more specific features to scales in which the weight of the load is automatically indicated on a dial.

One of the objects of the invention is the provision of an efficient construction for transferring total capacity weights to and from the scale beam.

Another object of the invention is the provision of a simple structure for transferring total capacity weights to and from the beam, in which the removal of the weights from the beam will be assured.

Another object of the invention is the provision of a structure which will assure registry of fingers of the weights with the weight rests of the weight cage, or weight carrier.

Another object of the invention is the provision of a practical device for restoring to operative position any weights which have become disarranged.

Another object of the invention is to provide a practical and simple structure of weight carrier, or cage capable of being erected at relatively small expense.

Another object of the invention is the provision of a weight of simple construction suitable for any operative position on the weight carrier and capable of being readily adjusted to occupy any such position, thus facilitating assembly and replacement of the weights on the weight carrier.

Other objects will be in part obvious and in part pointed out hereinafter.

The invention accordingly consists in the features of construction, combination of elements and arrangement of parts which will be exemplified in the construction hereinafter set forth, and the scope of the application of which will be indicated in the following claims.

In the accompanying drawings forming part of this specification wherein similar reference characters refer to similar parts throughout the several views, Figure 1 is a sectional elevation of a scale equipped with the invention, the front of the casing being removed for clearer disclosure of parts;

Figure 1:
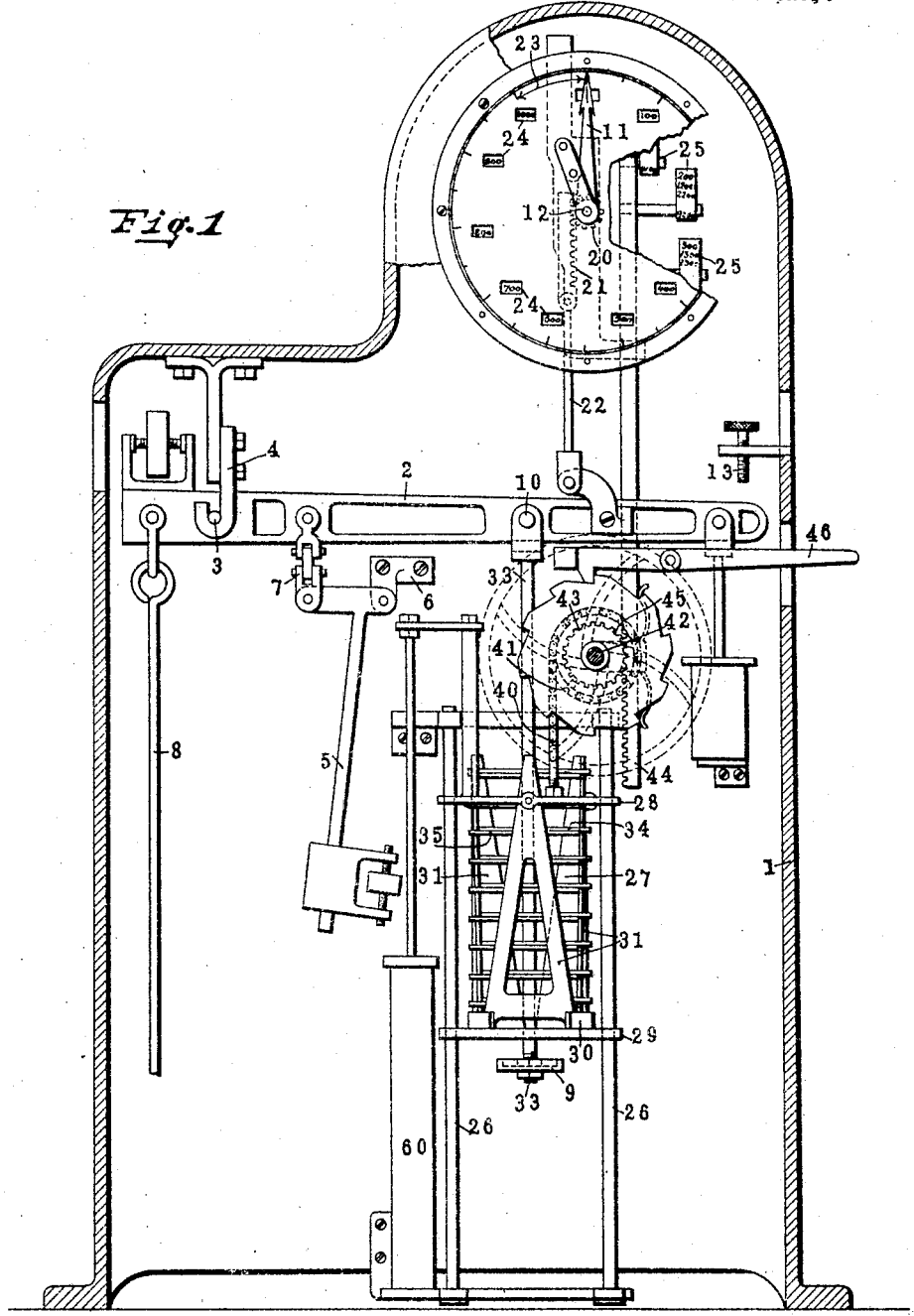
Figure 2:
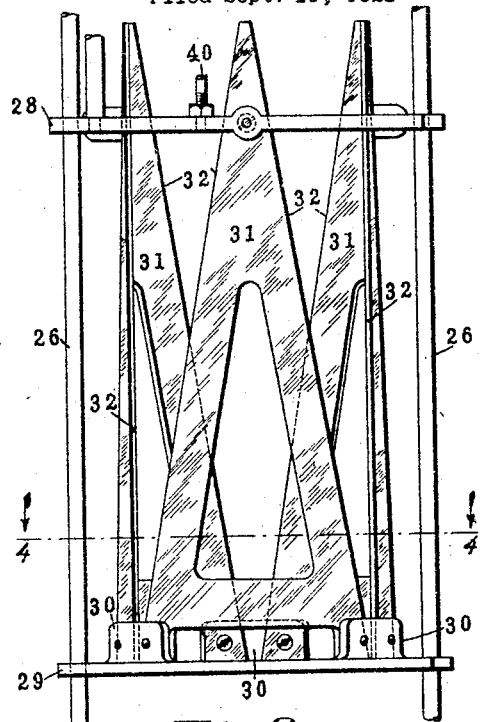
Fig. 2 is a side elevation of one form of weight carrier, or weight cage which may be employed.
Figure 3:
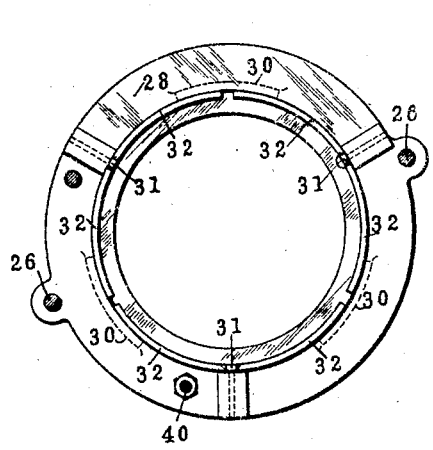
Fig. 3 is a plan view of Fig. 2.
Figure 4:
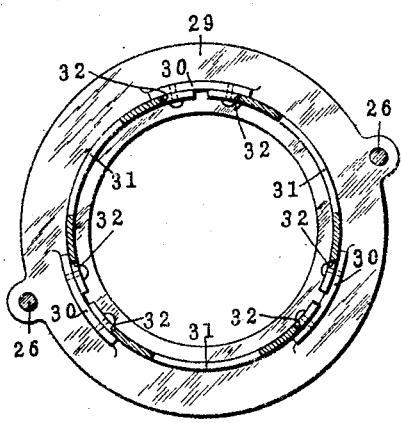
Fig. 4 is a cross-section of Fig. 2 on the line 4—4.
Figure 5:
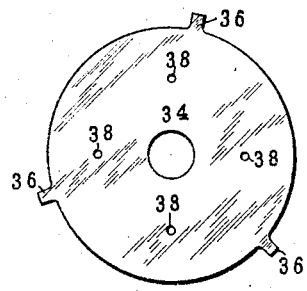
Fig. 5 is a plan view of one of the weight sections.
Figure 6:
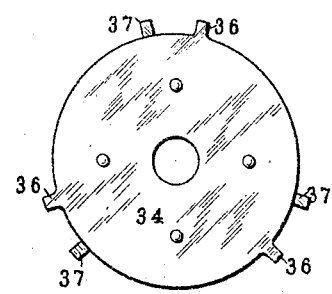
Fig. 6 is a plan view of a weight.

Referring now more specifically to the drawings and more particularly to Fig. 1 thereof a scale casing is indicated by the numeral 1. The numeral 2 indicates a weigh beam fulcrumed or pivoted to the casing or frame 1 at 3 by means of a bracket 4. At 5 is indicated a pendulum, in the present instance pivoted to a bracket 6 supported by the casing and having link connection 7 with the beam 2, the province of the pendulum being to counter-balance a load up to the capacity of the dial. At 8 is indicated a load supporting rod which extends downwardly from the beam 2 and is to be connected to the platform levers of the scale. The numeral 9 indicates a weight receiver, or pan, pivoted to the weigh beam 2 at 10. The numeral 11 indicates the dial pointer being, in the present instance a hand carried by a short shaft 12, the axis of which is within the graduated circumference of the dial. The shaft 12 is supported by the frame 1 in any suitable manner. The dial pointer 11 is operatively connected to the beam 2 and travels over the graduations of the dial in either of opposite directions in response to movements of the beam. Upward movement of the beam 2 may be limited by a stop 13. For operating the pointer 11 the shaft 12 is provided with a pinion 20, and a rack 21 and a rod 22 communicate movement to the pointer from the beam. As the beam rises and falls the pointer 11 travels in one direction or the other and indicates on the dial a weight within the capacity of the dial.

In the illustrated embodiment the front face of the dial is graduated for a full circumference, or circular line, lacking only a small arc indicated by the numeral 23. Opposite the main graduations of the dial are windows 24 in the dial. In rear of the dial are a series of number carriers or plates 25, each plate being provided with a series of numbers which appear at the adjacent windows so as to number the main graduations of the dial. In one position of the number plates the windows will be numbered from zero to one thousand in intervals of hundreds, as illustrated in Fig. 1. Between the windows the graduations on the dial are read in conjunction with the window reading to ascertain intermediate weights. By raising the number plates 25 to bring the next figures on the number plates opposite the windows, the main graduations will be numbered from one thousand to two thousand, and so on. The special dial and number plate herein disclosed together with the connections for operating the number plates in accordance with the movement of the weight carrier, or weight cage, hereinafter referred to, are illustrative as exemplifying a dial structure which may be employed in connection with the capacity weight transfer mechanism herein disclosed. Reference is made to the application of Alan E. Ashcraft filed March 16, 1921, Serial No. 452,710 for a full disclosure of the dial structure and the connections therefrom to the weight cage.

Figure 8:
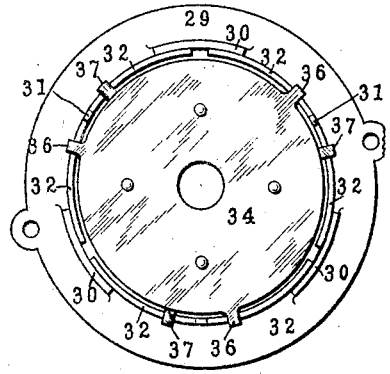
Fig. 8 is a plan view illustrating the weights in position in the weight carrier or cage.

Referring now more particularly to the specific subject matter of the present invention, numerals 26 indicate guide rods for the weight cage, or weight carrier, this latter being indicated generally in Fig. 1 by the numeral 27. The weight carrier, or cage, is a vibratory member in the sense that it is movable up and down on the guide rods 26, its movement in one direction effecting the deposit of weights on the weight receiver 9 and its movement in the opposite direction effecting the removal of the weights from the receiver 9 on the carrier. In the embodiment illustrated the weight carrier includes upper and lower braces, being flat metallic rings 28 and 29, the lower brace having upwardly extending lugs 30. Riveted to the lugs 30 are the side members, or upwardly extending studs, 31, the edges 32 of the studs converging upwardly to provide rests or resting surfaces for the weights. The studs are attached at their upper parts to the upper brace member 28 which lies outside the studs. In the present embodiment the weight carrier or cage formed by the studs and braces is circular in cross-section, the studs 31 being curved in a horizontal plane and receiving between them the capacity weights hereinafter more particularly referred to, the weights having fingers which rest on the converging sides of the upwardly extending members or studs 31. Circumferentially of the weight carrier the studs 31 alternate with spaces between the studs, and the fingers of the weights extend into the spaces as clearly indicated for instance in Figs. 1 and 8.

The weight receiver 9 vibrates with the beam 2 and comprises the shaft or rod 33 pivoted to the beam 2 at 10, and which extends downwardly through the weight carrier or cage, the braces 28 and 29 having openings permitting the carrier to freely pass the pan 9, as the carrier is moved up and down. The pan 9 lies below the weights in the path thereof, so that when the weight carrier is lowered, the weights therein will be deposited on the pan 9 and thus transferred to exert their influence on the weigh beam 2.

Figure 7:
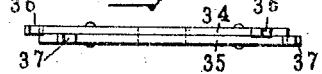
Fig. 7 is an edge view of a weight.

A plurality of weights is employed each equal to the capacity of the dial as marked out by one rotation of the pointer 11 over the graduated line. In the illustrated embodiment each weight is composed of two sections 34 and 35, each section having a central opening permitting the passage of the receiver rod 33. Each weight section includes laterally, preferably radially extending, supporting fingers, the fingers for one section being indicated by the numerals 36 and those for the other section by the numerals 37, these fingers being symmetrically disposed relative to the respective sections. In the present embodiment the weight sections are flat metallic disks generally circular in outline and of equal diameter and it will be understood that two weight sections may be assembled in superposed relation as illustrated in Fig. 7 with the laterally projecting supporting fingers 36 of one section spaced a greater or less distance circumferentially from the fingers 37 of the other section, and the fingers retained in predetermined adjusted position by riveting the sections together as explained. Thus the fingers are spaced apart transversely of the path of the weight-carrier. Rivet openings 38 may be provided in the sections at appropriate points. The weight carrier or cage may be raised and lowered through the instrumentality of a chain 40 connected to the upper brace 28 and passing over and fastened to a pulley or block 41 rotating with shaft 42, supported by the casing or frame of the machine, which shaft has a pinion 43 engaging rack 44 the upper end of which rack is attached to a frame carrying the number plates 25, so that descent of the weight carrier or cage elevates the number plates and ascent of the weight carrier effects downward movement of the number plates. To the shaft 42 is fastened a ratchet wheel 45 which may be engaged by a pawl 46 to arrest the descent of the cage. By lifting the pawl the cage will descend under its own weight and raise the number plates 25. To raise the cage a suitable hand wheel may be fastened to shaft 42, at a convenient point.

In operation the weight carrier will at first usually be in its extreme elevated position with a series of nine weights thereon, each weight being such as to balance a one thousand pound load as indicated on the dial of the scale. The diameter of the weights is such as to provide sufficient transverse clearance relative to the studs 31 to permit the free up and down movement of the weights relative to these studs at proper times. But the length of the fingers 36 and 37 will be greater than the transverse clearance between the weights and the studs, so that transverse movement of the weights will not disengage the fingers from the planes in which the sides of the studs lie. The weights, each composed of two sections riveted together, will rest on the sides 32 of the studs in superposed relation to each other and in different transverse planes, and it will be understood that the resting position of any weight on the weight carrier may be determined by the distance between the fingers 37 of one weight section and the fingers 36 of the other weight section, these fingers cooperating in pairs to engage the converging side edges of the studs at points along the length of the studs determined by the distance between adjacent fingers. The circumferential distance between adjacent fingers 36 and 37 of the respective weights should be such that the nine weights will be supported by the studs in equi-spaced vertical relation so that descent of the weight cage for a certain amount will transfer the lowermost weight to the pan 9 and permit the beam 2 to vibrate freely without being obstructed by the next superposed weight on the carrier. Further descent of the weight cage for an equal amount will transfer the next weight and so on until all the weights have been transferred to the pan. Similarly, ascent of the weight cage will remove the weights one by one from the pan of the weight receiver and gather them on the weight carrier in their original spaced relation.

It will be observed that the vertical extent of the studs 31 is such as to support the weights simultaneously thereon in the spaced relation referred to. It is also to be noted that the studs 31 hold the weights from rotating in transverse planes when in resting position on the weight carrier and while being transferred to the weight receiver and that, after the weights have been transferred to the weight receiver, the converging sides 32 may nevertheless continue to extend between the respective pairs of fingers, so that even should the weights become axially or rotatively displaced or otherwise disarranged from normal operative position they would be rotated in planes transverse to the path of movement of the weight carrier, back to their normal resting position on the studs. Thus it will be perceived that the edges 32 of the studs act as cam surfaces which engage the sides of the fingers of the weights to rotate the latter in case they are displaced. In the embodiment illustrated in Figs. 2 to 9 inclusive, the sides 32 of the studs 31 of the weight carrier incline circumferentially of the cage, some inclining in one direction and some in the opposite direction so as to provide the inverted generally V-shaped or tapering studs illustrated, the edges 32 being rectilinear and uninterrupted from the lower to the upper ends of the studs.

Figure 10:
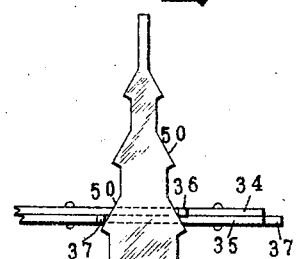
Fig. 10 is a view similar to Fig. 9 but showing a modified form of weight rest.
Figure 9:
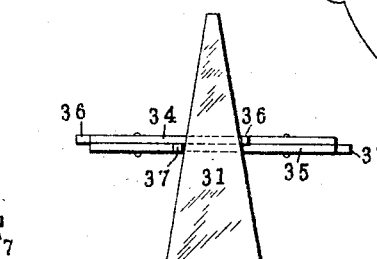
Fig. 9 is an elevation of a portion of the weight carrier or cage showing one of the upwardly extending studs, or weight rests, and weights associated therewith.
Figure 9:
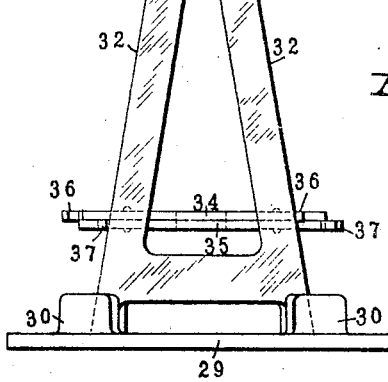

In the embodiment illustrated in Fig. 10 the uninterrupted and rectilinear side edges of the studs are replaced by a series of upwardly converging steps 50 on which the fingers of the weights may rest. The inclination of the steps 50 from the horizontal is not so great as the inclination of the side edges 32 therefrom. In consequence, for downward movement of the two types of weight-carriers for equal amounts, the type including the stepped studs will provide greater clearance between the studs and a weight deposited on the pan than will the other type. The type of Fig. 10 is indicated where a relatively short vertical dimension of weight carrier is required. The numeral 60 indicates a dash pot for steadying the movements of the weight carrier.

Thus by the above described construction are accomplished among others the objects hereinbefore referred.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:—

1. In a weighing scale, in combination, a vibratory weight-receiver, an upwardly and downwardly movable weight-carrier including a plurality of upwardly tapering studs adapted to support weights in superposed relation to each other, and weights composed of superposed connected sections, each having supporting fingers for engaging said studs, the distance between the fingers of any weight being such that it rests on said studs in a plane spaced from the other weights.

2. In a weighing scale, in combination, a vibratory weight-receiver, a weight, a weight-carrier movable in one direction to deposit the weight on said receiver and in the opposite direction to remove the weight from said receiver, and means adapted to cooperate with said weight to rotate the same in a plane transverse to the path of movement of said carrier.

3. In a weighing-scale, in combination, a vibratory weight-receiver, a plurality of weights, a weight-carrier movable in one direction to deposit the weights on said receiver and in the opposite direction to remove the weights from said receiver, said weights including laterally extending fingers, and means adapted to co-operate with said fingers to rotate the weights in planes transverse of the path of movement of said carrier.

4. In a weighing scale, in combination, a vibratory weight-receiver, a plurality of weights, a weight-carrier movable in one direction to deposit the weights on said receiver and in the opposite direction to remove the weights from said receiver, said weights including laterally extending fingers, and means adapted to co-operate with said fingers to rotate the weights in planes transverse of the path of movement of said carrier, said means including upwardly extending cam surfaces adapted to engage the sides of said fingers.

5. In a weighing scale, in combination, a vibratory weight-receiver, a plurality of weights, a weight-carrier movable in one direction to deposit the weights on said receiver and in the opposite direction to remove the weights from said receiver, said weights including laterally extending fingers, and means adapted to co-operate with said fingers to rotate the weights in planes transverse of the path of movement of said carrier, said means including upwardly extending cam surfaces on said carrier adapted to engage the sides of said fingers.

6. In a weighing scale, in combination, a vibratory weight-receiver, a plurality of superposed weights, a weight-carrier movable in one direction to deposit the weights on said receiver and in the opposite direction to remove the weights from said receiver, each of said weights including a pair of laterally extending fingers, the distance between the fingers of lower weights being greater than that between the fingers of upper weights.

7. In a weighing scale, in combination, a vibratory weight-receiver, a plurality of superposed weights, a weight-carrier movable in one direction to deposit the weights on said receiver and in the opposite direction to remove the weights from said receiver, each of said weights including a pair of laterally extending fingers, the distance between the fingers of lower weights being greater than that between the fingers of upper weights, said carrier including an upwardly extending weight rest adapted to simultaneously engage between the fingers of each of said pairs and support the weights in different transverse planes.

8. In a weighing scale, in combination, a vibratory weight-receiver, a plurality of superposed weights, a weight-carrier movable in one direction to deposit the weights on said receiver and in the opposite direction to remove the weights from said receiver, each of said weights including a pair of laterally extending fingers, the distance between the fingers of lower weights being greater than that between the fingers of upper weights, said carrier including an upwardly extending weight rest adapted to simultaneously engage between the fingers of each of said pairs and support the weights in different transverse planes, the finger engaging sides of said weight rest converging upwardly.

9. In a weighing scale, in combination, a vibratory weight-receiver, a plurality of superposed weights, a weight-carrier movable in one direction to deposit the weights on said receiver and in the opposite direction to remove the weights from said receiver, each of said weights including a pair of laterally extending fingers, the distance between the fingers of lower weights being greater than that between the fingers of upper weights, said carrier including an upwardly extending weight rest adapted to simultaneously engage between the fingers of each of said pairs and support the weights in different transverse planes, the finger engaging sides of said weight rest being uninterrupted and converging upwardly.

10. In a weighing scale, in combination, a vibratory weight-receiver, a plurality of superposed weights, a weight-carrier movable in one direction to deposit the weights on said receiver and in the opposite direction to remove the weights from said receiver each of said weights including a pair of laterally extending fingers, the distance between the fingers of lower weights being greater than that between the fingers of upper weights, said carrier including an upwardly extending weight rest adapted to simultaneously engage between the fingers of each of said pairs and support the weights in different transverse planes, the finer engaging sides of said weight rest being rectilinear and converging upwardly.

11. In a weighing scale, in combination, a vibratory weight-receiver, a plurality of superposed weights, a weight-carrier movable in one direction to deposit the weight on said receiver and in the opposite direction to remove the weights from said receiver, each of said weights including a pair of laterally extending fingers, the distance between the fingers of lower weights being greater than that between the fingers of upper weights, said carrier including an upwardly extending weight rest adapted to simultaneously engage between the fingers of each of said pairs and support the weights in different transverse planes, the finger engaging sides of said weight rest converging upwardly and comprising a series of upwardly converging steps on which the pairs of fingers of said weights rest, respectively.

12. In a weighing scale, in combination, an upwardly and downwardly movable weight-cage the side of which includes upwardly extending studs having sides inclining circumferentially of the cage some in one direction and some in the opposite direction, a plurality of weights in said cage adapted to rest on the sides of said studs in different transverse planes and a vibratory weight receiver below and in the path of said weights.

13. In a weighing scale, in combination, an upwardly and downwardly movable weight-cage the side of which includes upwardly extending studs having sides inclining circumferentially of the cage some in one direction and some in the opposite direction. a plurality of superposed weights in said cage including fingers adapted to rest on the inclined sides of said studs in different transverse planes, and a vibratory weight-receiver below and in the path of said weights.

14. In a weighing scale, in combination, an upwardly and downwardly movable weight cage the sides of which include upwardly tapering studs, a plurality of weights adapted to rest on said studs in different transverse planes, and an upwardly and downwardly movable weight receiver below and in the path of said weights.

15. In a weighing scale, in combination, an upwardly and downwardly movable weight cage the sides of which include upwardly tapering studs, a plurality of superposed weights, including fingers adapted to rest on the inclined sides of said studs in different transverse planes, and an upwardly and downwardly movable weight receiver below and in the path of said weights.

16. In a weighing scale, in combination, an upwardly and downwardly movable weight cage the sides of which include upwardly tapering studs, a plurality of superposed weights transversely spaced from said studs, said weights having lateral fingers resting on the inclined sides of said studs in different transverse planes, and an upwardly and downwardly movable weight receiver below and in the path of said weights, the length of said fingers being greater than the transverse clearance between said weights and said studs.

17. In a weighing scale, in combination, an upwardly and downwardly movable weight cage the sides of which include upwardly tapering studs, a plurality of weights adapted to rest on said studs in different transverse planes, and an upwardly and downwardly movable weight receiver below and in the path of said weights, the upward extent of said studs being sufficient to support said weights in spaced relation simultaneously.

18. A weight cage including side members alternating with spaces between said members, the edges of said side members converging upwardly to provide rests for a weight.

19. In a weight cage, in combination, a plurality of side members the edges of which converge upwardly, and upper and lower braces outside said side members and connecting the same together.

20. In a weight cage, in combination, a plurality of side members the edges of which converge upwardly, and upper and lower braces outside said side members and connecting the same together, said side members being curved in a horizontal plane.

21. A weight cage including side members alternating with spaces between said members, the edges of said side members converging upwardly to provide rests for a weight, and a weight having fingers adjustable relative to each other to determine its horizontal resting plane on said edges.

22. In combination, a plurality of weights each comprising a plurality of sections, and weight supports on two sections of each weight, the weight supports being spaced apart at different distances on the several weights.

23. In combination, a sectional weight, a projecting finger on each of two of said sections, and means adapted to secure said sections together with the fingers spaced apart to a predetermined degree.

24. As an article of manufacture a weight including a plurality of sections normally fixed in predetermined relative positions, and laterally projecting supporting fingers carried by each section.

25. In combination, a reciprocally movable weight carrier, and one or more weights in the path of movement thereof, said weight or weights including supporting fingers spaced from each other transversely of said path, and said carrier including weight supporting studs extending between pairs of fingers of the weight or weights, respectively, longitudinally of said path.

26. In combination, a reciprocally movable weight carrier, and one or more weights in the path of movement thereof, said weight or weights including supporting fingers spaced from each other transversely of said path, and said carrier including weight supporting studs extending between pairs of fingers of the weight or weights, respectively, longitudinally of said path, said studs being of such longitudinal extent as simultaneously to support a plurality of the weights in superposed spaced relation.

27. In combination, a carrier, a plurality of weights adapted to be supported thereby, each weight comprising a plurality of sections, and weight supports on each of two sections of each weight and adapted to engage said weight carrier, the weight supports being spaced apart at different distances on the several weights.

28. A weight including a plurality of sections, a plurality of supporting means forming a part of each section, said means being adapted to be adjusted relative to the said sections, and means for subsequently preventing movement of the parts of the weight with respect to each other.

In testimony whereof I affix my signature, in the presence of two witnesses.

NILS H. ANDERSON.

Witnesses:
B. B. JOYCE,
P. B. CARLSON.